J. RARICK.
AUTOMATIC HOUSEHOLD FILTER.
APPLICATION FILED SEPT. 1, 1909.
967,554.
Patented Aug. 16, 1910.
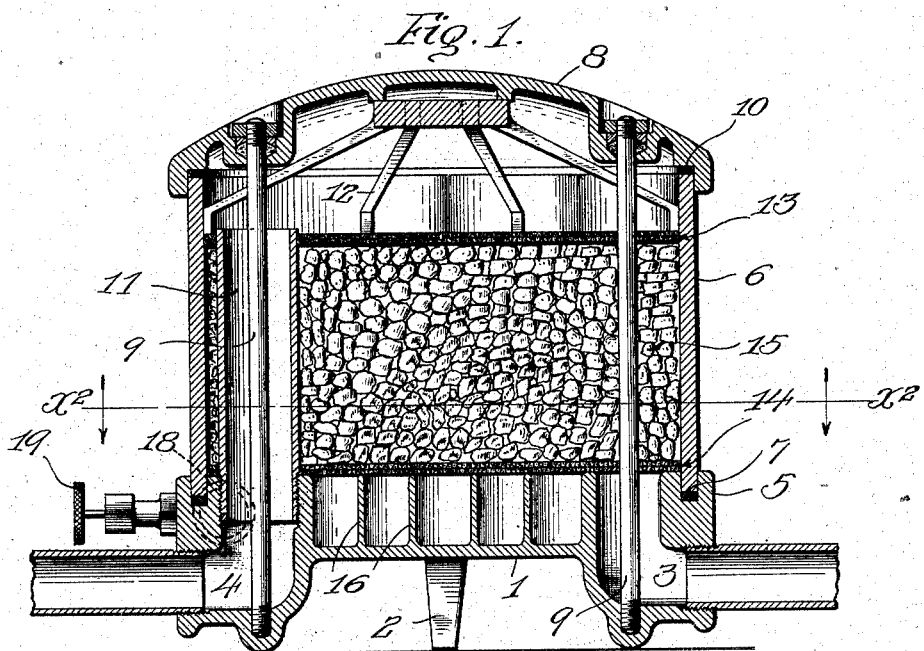
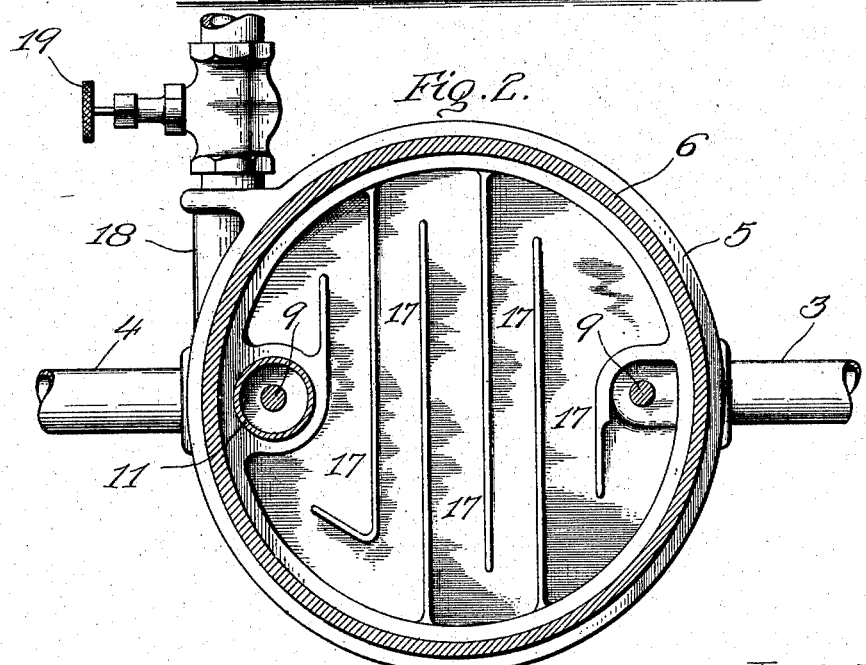
Witnesses.
Geo. J. Huting.
Louis W. Gratz.
Inventor.
John Rarick.
by Raummd Hau & Hackley
attys.

UNITED STATES PATENT OFFICE.

JOHN RARICK, OF UPLAND, CALIFORNIA.

AUTOMATIC HOUSEHOLD-FILTER.

967,554.  Specification of Letters Patent.  Patented Aug. 16, 1910.

Application filed September 1, 1909. Serial No. 515,728.

*To all whom it may concern:*

Be it known that I, JOHN RARICK, a citizen of the United States, residing at Upland, in the county of San Bernardino and State of California, have invented a new and useful Automatic Household-Filter, of which the following is a specification.

This invention relates to filters and the object of the invention is to provide a filter which is especially adapted for household use, it being adapted to be connected to the pipe which supplies water under pressure.

One of the most important objects of the invention is to provide for an automatic self-cleaning operation of the filter. This is accomplished by passing the water to be filtered through one or more screens and so constructing the parts that a pulsating effect is produced which causes a vibratory action of the screen or screens, such that it prevents the accumulation of impurities thereon.

Another important object is to provide for enabling the filter to be cleaned while in operation. I accomplish this by allowing the filtered matter to settle by gravity to the bottom portion of the filter and then I provide for flushing out the bottom portion of the filter and thus removing matter which has accumulated therein.

Referring to the drawings: Figure 1 is a vertical, longitudinal section through a filter. Fig. 2 is a cross section on line $x^2$—$x^2$ Fig. 1.

The filter comprises a base 1 having two legs 2 and enlarged inlet connections 3 and 4 which project from the base 1 the same distance as legs 2 and thus also serve as legs. The base 1 has an annular rim 5 which is grooved to receive the lower edge of a casing 6, suitable packing 7 being employed at the lower edge of the casing 6 to prevent leakage. Resting on the upper end of the casing 6 is a cap 8 which is firmly held in position by tie-rods 9 which are screwed in the base portions 3 and 4. Suitable packing 10 is provided at the upper edge of the casing 6 to prevent possible leakage.

A tube 11 extends up from the connection 4 and its upper edge terminates at a point below the cap 8. The tie-rod 9 extends centrally through the tube 11, as shown. A spider 12 is arranged in the upper part of the chamber immediately below the cap 8 and supports one or more screens 13 formed preferably of copper wire. Similar screens 14 are located in the lower part of the chamber and rest immediately above the base 1. The space between screens 13 and 14 is filled with a filtering material such for example, as charcoal 15. The base 1 is formed with a series of partitions or baffle plates 16 which form a tortuous passage 17 leading from the inlet connection 3 to a flushing connection 18. As clearly shown in Fig. 1, the inlet connection 3 and outlet connection 4 are both level with each other and below the level of the tortuous passage 17, while the flushing connection 18 is on a level with the tortuous passage 17, as shown in Fig. 1.

In operation, water enters through the inlet connection 3 and passing up through the screens 14 is partially filtered. Thence it passes through the charcoal 15 and through the screens 13 into the space in the upper part of the chamber immediately below the cap 8. The top of the tube 11 projects but slightly above the screen 13, so that water passes into the tube 11 as soon as it passes through the screen 13. This leaves an air chamber above the screen 13 immediately below the cap 8. The water in passing through the screens 14, charcoal 15 and screens 13 is relieved of its impurities and these impurities work downward. Impurities fall from the lower screen 14 into the tortuous passage 17. Owing to the constant variation in the water pressure which operates to intermittently compress the air in the upper portion of the chamber, a pulsating effect throughout the chamber is caused which causes vibration of the screens 14 which prevents the accumulation of filtered impurities thereon, so that the filtered matter falls into the tortuous passage 17.

When it is desired to clean the filter, the valve 19 is opened, whereupon water from the inlet connection 3 passes directly through the tortuous passage 17 and out through the flushing connection 18, in its passage through the tortuous channel 17 removing all accumulation of impurities. After the impurities have thus been removed valve 19 is closed.

What I claim is:

1. A filter comprising a filtering chamber, filtering means in one portion of the chamber forming an air space in another portion, an outlet 4 communicating with said air space, an inlet 3 communicating with the filtering material, a flushing outlet 18 communicating with the chamber below the filtering material whereby the impurities which have been deposited therein by the pulsations within the chamber may be flushed therefrom through the flushing connection, and means forming a tortuous passage in the chamber below the filtering material between said inlet 3 and said flushing outlet 18.

2. A filter comprising a chamber, a recessed base therefor, filtering material above said base comprising a screen, charcoal above the screen, another screen above the charcoal and leaving an air space above the latter screen, an outlet tube extending vertically from the base into said air chamber, an outlet connection formed in said base communicating with said tube, an inlet connection communicating with the recess in the base, a flushing connection communicating with the recess in the base, and a series of baffle plates forming a tortuous passage in the recess in the base between the inlet connection and the flushing connection.

3. A filter comprising a chamber, a recessed base therefor, filtering material above said base comprising a screen, charcoal above the screen, another screen above the charcoal and leaving an air space above the latter screen, an outlet tube extending vertically from the base into said air chamber, an outlet connection formed in said base communicating with said tube, an inlet connection communicating with the recess in the base, a flushing connection communicating with the recess in the base, and a series of baffle plates forming a tortuous passage in the recess in the base between the inlet connection and the flushing connection, a cap on said chamber, stay-bolts extending through the cap and into the base, and a spider below the cap supporting the upper screens.

In testimony whereof, I have hereunto set my hand at Los Angeles, California, this 24th day of August, 1909.

JOHN RARICK.

In presence of—
  G. T. HACKLEY,
  ISABEL HALL.